July 4, 1933.  R. E. EVANS  1,917,023
WINDSHIELD HEATER
Original Filed March 8, 1929

INVENTOR
Rollo E. Evans
BY
Arthur E. Brown
ATTORNEY

Patented July 4, 1933

1,917,023

UNITED STATES PATENT OFFICE

ROLLO E. EVANS, OF EMPORIA, KANSAS

WINDSHIELD HEATER

Application filed March 8, 1929, Serial No. 345,321. Renewed December 5, 1932.

My invention relates to heating devices and more particularly to devices for conducting heat produced in the operation of an engine to an area to be heated, the principal object of the invention being to conduct air heated by the exhaust conduit of an automobile engine into contact with the windshield of the automobile for heating the same to remove moisture and particularly to remove frozen moisture, and prevent the formation of a view-obscuring film on the windshield.

Further objects of the invention are to support a heated air conducting member in functioning relation with a window and to direct the heated air effectively into contact with the area of the window to be heated.

In accomplishing these and other objects of the invention, I have provided improved details of structure, the preferred forms of which are illustrated in the accompanying drawing, wherein.

Figure 1:
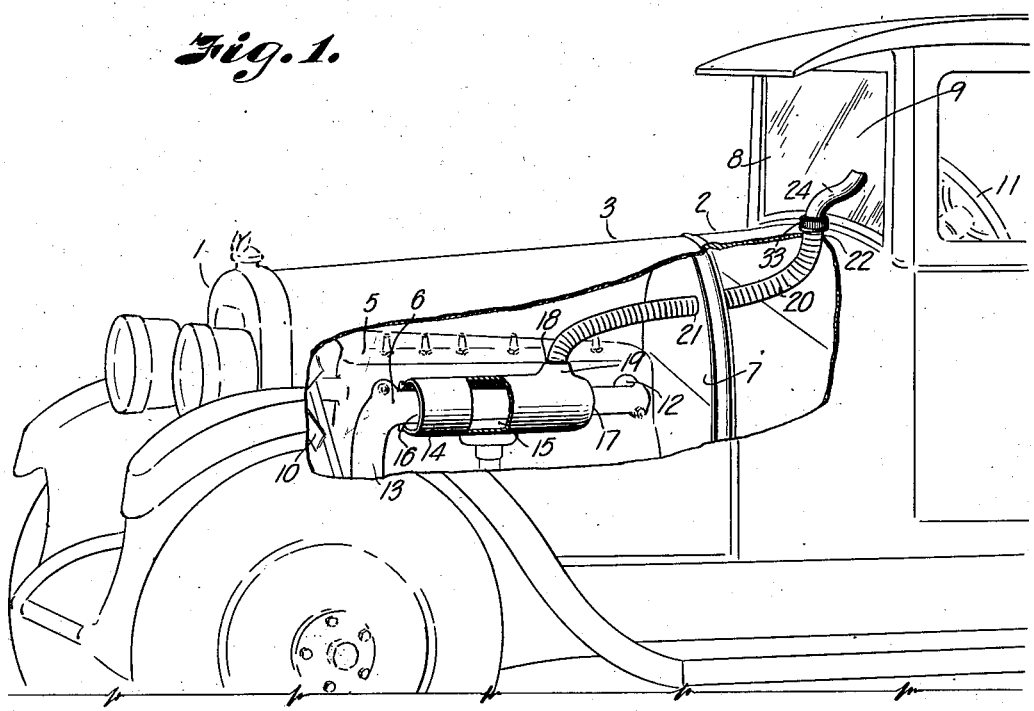
Fig. 1 is a perspective view of the front portion of an automobile and my improved windshield heating device mounted thereon, part of casing elements being broken away to show enclosed portions of the device.
Figure 2:
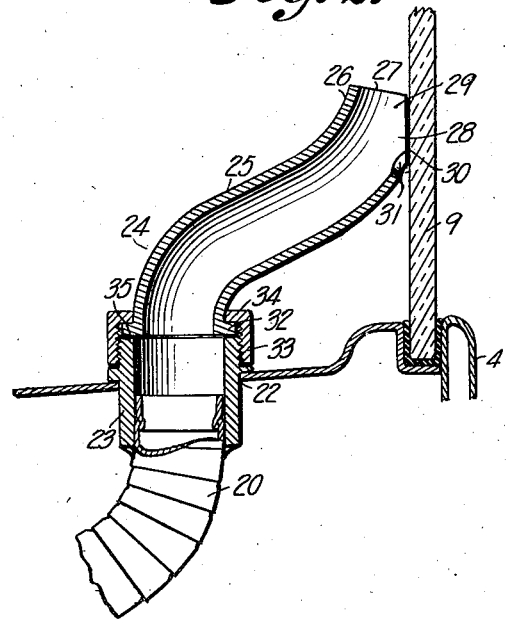
Fig. 2 is an enlarged longitudinal vertical central section of portions of a cowl, windshield, and supporting member of an automobile and the outlet end of my heating device in functional relation therewith.
Figure 3:
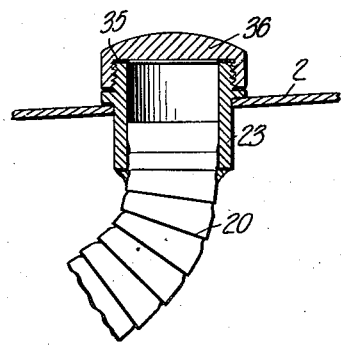
Fig. 3 is a longitudinal section of a supporting portion of the cowl and the outlet end of a heated air tube illustrating a tube closing cap employed when the heater is not in use.

Referring in detail to the drawing:

1 designates generally an automobile including casing elements 2 and 3 comprising respectively a cowl and a hood, a supporting wall member 4, and an engine 5 covered by the hood and having an exhaust conduit 6 for conducting hot gases comprising the products of combustion from the engine.

A partition-like supporting wall 7 is adapted to retain and support the front end of the cowl and to receive the rear edge of the hood. A windshield 8 including a pane 9 is mounted at the rear edge of the cowl. The automobile further includes a fan 10 and a steering wheel 11.

The elements described include ordinary automobile structure and are illustrated to represent apparatus including a prime mover such as an engine, and a window which it is desired to keep clear of moisture and ice by means of the heat produced in the operation of the engine.

The conduit for conducting heated fluid comprises in the illustrated structure an exhaust manifold 12 receiving burned and hot gases from the several cylinders of the engine and an exhaust pipe 13 for conducting the hot gases away from the engine and the automobile.

A heater 14 mounted in a position to receive heat from the engine is illustrated as a casing spaced from the exhaust manifold to form an air-receiving and conducting chamber 15 wherein air may move over the manifold to be heated thereby, and having an open end 16 preferably directed toward the fan 10 of the automobile and a closed end 17. The heater may be of the type applied to an exhaust conduit, either to the manifold or to the exhaust pipe, in ordinary practice.

The heater has an outlet 18 in a boss 19 preferably in its upper surface adjacent the rear end adapted to receive a windshield heating tube 20 presently more particularly described.

The tube 20 extends preferably through an opening 21 in the partition 7. An opening 22 is provided in the cowl to receive a threaded nipple 23 into which the upper end of the tube may be inserted and fixed. The nipple is positioned adjacent the windshield so that air passing through the casing and heated by the exhaust gases moving in the conduit will be delivered toward the windshield.

I further provide a nozzle 24 connected with the tube 20 through the nipple and including a curved body portion 25 adapted to conduct heated air from the nipple to a portion of the windshield which it is desired to heat. The delivery end 26 of the nozzle is upturned and provided with an upwardly discharging mouth portion 27 and a laterally discharging mouth portion 28 whereby the heated air is coincidently delivered substantially right-angularly to the pane and tangentially thereto for spreading over the pane.

The delivery end of the nozzle is formed to provide substantially parallel side wings or shields 29 extending vertically and substantially at right angles to the pane for confining the heated air to movement through the mouth portions 27 and 28 and preventing outflow laterally from the nozzle, and preventing air currents from entering the nozzle from the sides.

The edges 30 of the wings are adapted to lie substantially parallel with and substantially in contact with the vertical surface of the pane, and the lower edge of the mouth portion 28 is spaced from the pane sufficiently to provide a notch or opening 31 whereby moisture and partly melted ice and snow masses may be permitted to move downwardly over the pane past the nozzle.

The nozzle is preferably provided with an annular flange 32 at its lower end and an attaching ring 33 having a flange 34 overlying the flange 32 of the nozzle is adapted for screwthreaded engagement with the nipple to latch the nozzle sealingly to the nipple, a gasket 35 being preferably mounted between the nipple and the nozzle.

A cap 36 may be provided for mounting on the nipple when the nozzle is removed.

In using the invention the air conducting conduit or tube is suitably related with the engine for receiving heat therefrom and the outer end of the tube is mounted in a suitable position adjacent the windshield, for example at one side of the apex of the cowl and substantially in front of the wheel. In an automobile having an exhaust conduit on the same side of the engine as the wheel, the tube will extend substantially in a straight line past the exhaust conduit to the windshield.

A nozzle is provided having a body suitably curved for conducting the heated air for delivery against the surface of the windshield at a desired position, preferably against the side of the windshield adjacent the wheel, and through which the driver of the automobile may view the road.

The tube is connected to a heater mounted on the exhaust and a heater may be provided for this purpose mounted on the manifold and adapted and in a position to receive and trap air impelled by the fan so that when the engine is operating, air will pass over the manifold and be heated thereby and pass through the tube and nozzle into contact with the surface of the window.

A few minutes of engine operation will heat and deliver air to the windshield in sufficient volume and at a high enough temperature to melt ice which may be formed on the window and to evaporate moisture thereon.

The device will continue to function while the engine is running to heat the windshield and tend to prevent deposit of moisture and formation of ice while the automobile is moving.

In extremely cold or in warm and dry weather or under other conditions not tending to produce an obscuring film on the window, the nozzle may be removed and stored in the automobile, and the cap may then be applied to the nipple.

What I claim and desire to secure by Letters Patent is:

1. A windshield heater including a casing for conducting a heating medium toward the windshield of an automobile and a nozzle having an open upturned delivery end for discharging said medium substantially tangentially to the windshield over a large area of the windshield relative to the opening of the nozzle and having a laterally presented opening for discharging said medium substantially right angularly to said windshield.

2. In a windshield heater including means for delivering a heating medium toward a windshield or the like, an arcuate nozzle having an upturned delivery end forming a vertically directed mouth portion and having side wings engaging the windshield to form a laterally presented mouth portion having a notched lower transverse edge spaced from the windshield to permit downward movement of melting snow or ice over the windshield past the nozzle.

3. A windshield heater including a casing for delivering a heating medium toward a windshield, an arcuate nozzle removably carried thereby, said nozzle having an upturned end forming a vertically directed mouth portion, side wings carried by said nozzle at its mouth portion forming a laterally directed mouth portion, said last mentioned mouth portion having a notched lower edge spaced from said windshield to permit melted snow and ice to pass without entering said nozzle, and a closure for said casing when said nozzle is removed.

In testimony whereof I affix my signature.

ROLLO E. EVANS.